June 29, 1937.  A. B. NEWELL  2,085,442
REMOTE CONTROL
Filed Feb. 7, 1935   3 Sheets-Sheet 1
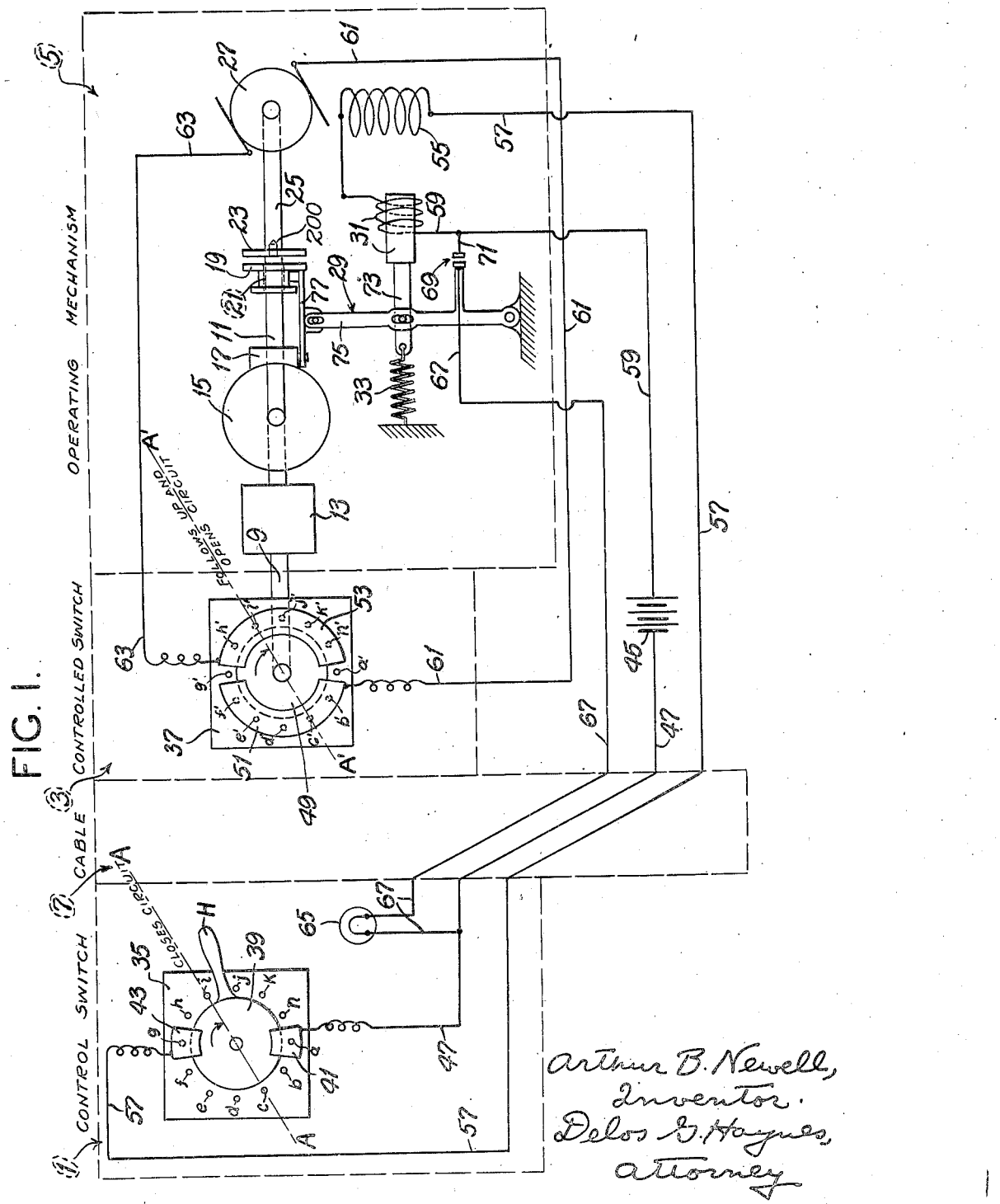

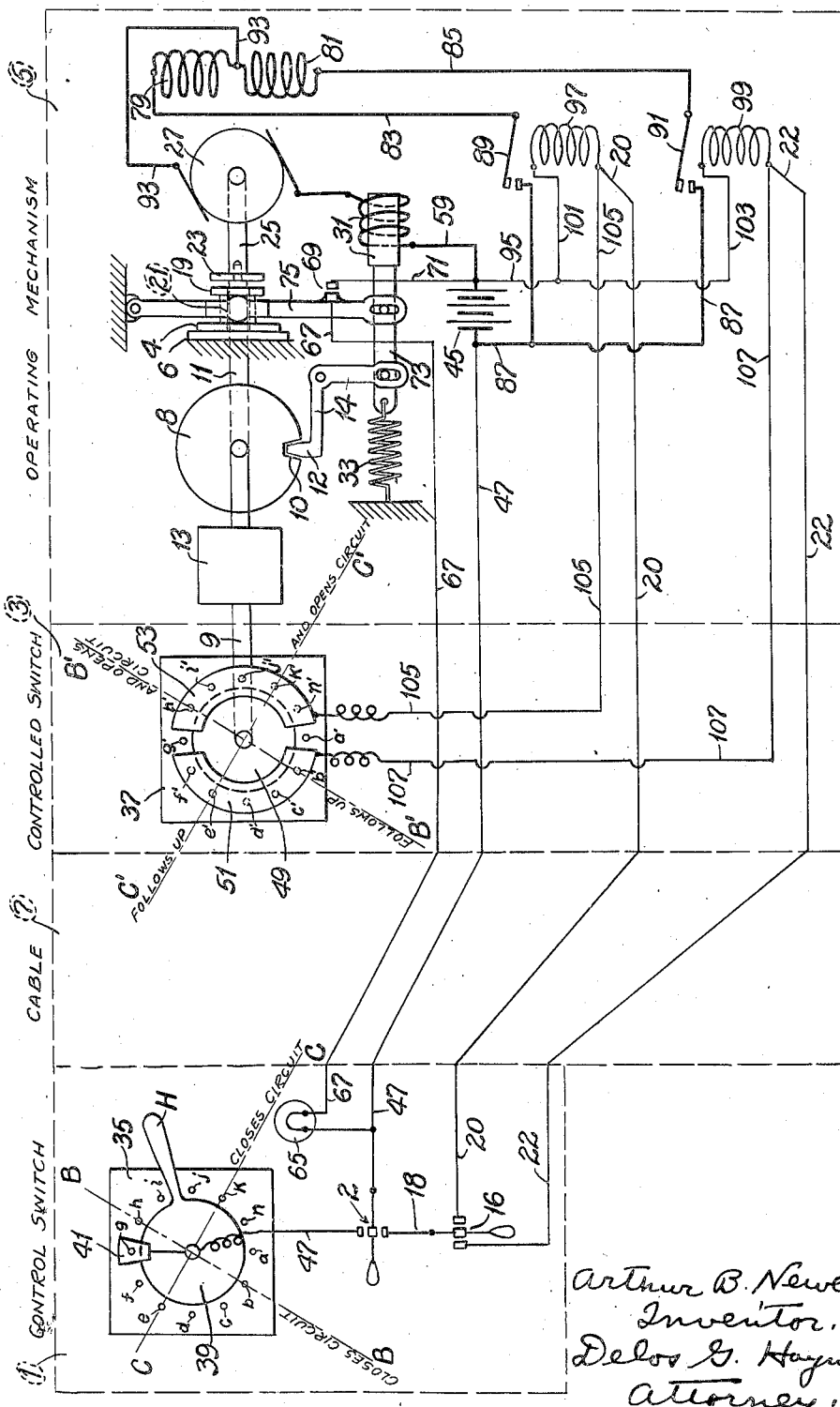

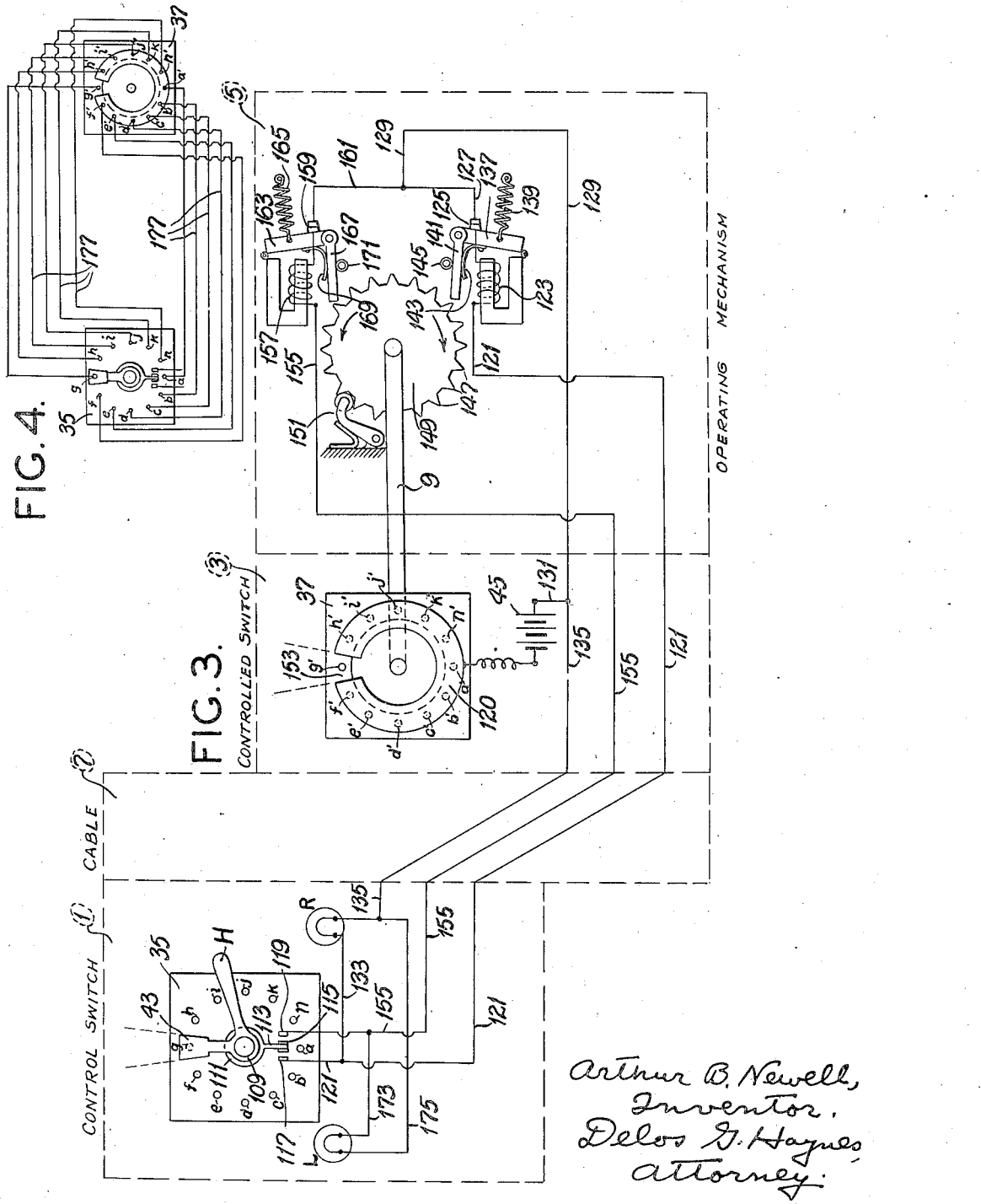

Patented June 29, 1937

2,085,442

UNITED STATES PATENT OFFICE 2,085,442

REMOTE CONTROL

Arthur B. Newell, Kirkwood, Mo.

Application February 7, 1935, Serial No. 5,365

14 Claims. (Cl. 172—239)

This invention relates to remote controls in general, and with regard to certain more specific features, to electric remote controls for controlling operating members of vehicles and the like.

Among the several objects of the invention may be noted the provision of a simple, dependable remote control which is particularly adapted to the exacting service required in controlling airplane wing surfaces and the like, and hence to any similarly exacting land or marine service; the provision of a control of the class described which eliminates weighty and complicated mechanical cable or other extensions; the provision of a control of the class described which is light and flexible and adapted to be applied to a variety of constructions with maximum simplicity; the provision of a control which relieves an operator of substantially all of the heavy manual effort heretofore ordinarily required; the provision of apparatus of the class described which is at all times reliable and which even upon partial failure can be successfully operated; and the provision of apparatus of this class which is positive and simple in operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention;

Fig. 1 is a diagrammatic layout showing one form of the invention;

Fig. 2 is a view similar to Fig. 1 showing another form of the invention;

Fig. 3 is a view similar to Fig. 1 showing a second form of the invention; and,

Fig. 4 is a diagrammatic detail showing certain switch connections.

Similar reference characters indicate corresponding parts throughout the several views of the drawings.

Heretofore, both in the case of manual control of an airplane by a pilot and in the case of automatic control, it has been the custom to employ either a mechanical system for transferring energy from the control point to the controlled point, or an exceedingly complicated electrical or pneumatic system. Cables, pulleys, links, pipe and the like have been used, as well as complicated switch and relay circuits. Furthermore, these have been of a nature that when installed, complication of the system seriously interfered with other necessary operating parts. They required an excessive amount of space and often were unsafe, as well as requiring (in the cases of the mechanical systems) a substantial amount of effort on the part of the operator. It was also difficult to repair them when once they became out of order. The present invention overcomes these and other obvious difficulties.

It is to be understood hereinafter, although the case is used of an airplane with the requirement for the remote control of wing surfaces in certain positions, by a pilot in another position, that this is exemplary and that other applications of the system may be made.

Referring now more particularly to Fig. 1, there is shown at numeral 1 a control switch unit located, for example, near the operator in the operating cabin of a ship.

At numeral 3 is shown the unit to be controlled. At numeral 5 is shown an operating mechanism for operating the controlled unit. Numeral 7 indicates the electric cable for enclosing the wires to be described for connecting the control unit, the controlled unit and the operating mechanism.

At numeral 9 is shown the shaft or other element to be controlled angularly. This is connected with the wing surface which is to be angularly controlled (in the present example). The shaft 9 is operated from a shaft 11 through a speed reducing gear 13. This gear 13 is preferably of the class which will transfer said motion from the shaft 11 to the shaft 9 in either direction but which will not transfer motion from the shaft 9 back to the shaft 11. A worm gear system will accomplish this result. It is to be understood, however, that other types of gearing may be used in view of certain other provisions in certain modifications of the present system.

The system of shafting 11 includes a brake drum 15 with which cooperates a brake shoe 17. The shafting 11 also includes one element 19 of a clutch splined at 21 so as to permit longitudinal movement but not relative rotary movement with respect to the shafting 11. The other element of the clutch is indicated at numeral 23 and is fastened to drive shafting 25, the latter extending from a motor 27. A pilot bearing is shown at 200.

A linkage 29 articulates the clutch member 19 and brake shoe 17, and a solenoid 31 such that when the clutch 19, 23 is closed, the brake shoe 17 is released and vice versa. A spring 33 normally reacts to return the mechanism 29 to a position such that the clutch 19, 23 is open and the brake 17 set (as in Fig. 1). Under these conditions the solenoid 31 is de-energized, as will be shown.

At numeral 35 is shown a control switch located near the operator consisting of contacts $a$ to $n$ in order, and at numeral 37 is shown a controlled switch consisting of contacts $a'$ to $n'$ in the same order. Contacts $a$ and $a'$ are connected by a conducting wire. Contacts $b$ and $b'$ are also likewise connected and the other contacts likewise respectively connected and likewise respectively lettered. It is to be understood that the number of contacts shown is exemplary and that any number $n$ may be used.

The wires used for connecting the respective contacts are all bundled into a single cable reaching from the operator's position to the position of the controlled switch 37 which may be quite compactly arranged with the motor 27 and auxiliary units elsewhere itemized near the device which is to be operated or controlled. This cable also includes certain other wires to be enumerated hereinafter and also certain spare wires which may be substituted quickly if any one of the connections between the contacts $a$—$a'$, $b$—$b'$, etc., fail. As will be seen hereinafter, a failure of one or more of these wires, short of substantially the complete set, does not result in crippling the control as a whole.

At numeral 39 is shown a rotatable insulating disc for supporting oppositely disposed, insulated brushes 41 and 43 adapted, upon rotation of the disc 39, to successively contact the contacts $a$—$n$ by pairs.

A battery 45 energizes the brush 41 by way of wire 47 and hence energizes the contact on switch 35 upon which the brush 41 is resting, as for instance, contact $a$ in the position shown. This also energizes the corresponding contact $a'$ on switch 37 because contacts $a$ and $a'$ are cross connected.

The controlled switch 37 has an insulating disc 49 attached to said shaft 9. The disc 49 supports a pair of brushes 51 and 53. Each brush 51 and 53 subtends an arc providing contact with one-half of the contacts $a$—$n$ minus one. Thus two contacts are left untouched by the brushes 51 and 53. In the drawings these are shown as contacts $a'$ and $g'$, these corresponding to contacts $a$ and $g$ of switch 35, but in the latter switch the contacts $a$ and $g$ are contacted by the brushes 41 and 43 respectively.

The brush 43 of switch 35 is connected to the field winding 55 of said motor 27, this connection being made by means of wire 57. The field winding 55 is connected to the battery 45 through said solenoid 31 and by means of a wire 59.

The brush 51 of switch 37 is connected to one side of the armature of motor 27 by means of a wire 61, and the other brush 53 of said switch 37 is connected to the other side of said armature by means of a wire 63.

A pilot lamp 65 or equivalent signal, is located near the switch 35 and operator, and is connected across the battery 45 by wire 67, switch 69, and wire 71. As shown, the switch 69 is controlled from the linkage 29 so that when the clutch 19, 23 is closed, the switch 69 is also closed, thus energizing the pilot lamp 65. On the other hand, when the clutch 19, 29 is opened (and consequently the brake 17 set), the switch 69 is opened and the pilot lamp 65 is de-energized.

The operation of the apparatus is as follows:

Assuming that the operator (by means of handle H) moves the brushes 41, 43 from the position shown in Fig. 1 to a position along the line A—A, current flows from the battery 45 through wire 47 to brush 41 which is now on contact $c$. Contact $c$ being connected with contact $c'$ on switch 37 also energizes the latter, and consequently also the brush 51 which is in contact with said contact $c'$. Current then flows over wire 61, through the armature of motor 27, wire 63 and to brush 53. The current from brush 53 then passes into contact $i'$ and then to contact $i$ at switch 35, brush 43, wire 57, field winding 55, solenoid 31, wire 59 and back to the battery 45.

Energization of the solenoid 31 draws over link 73 of the linkage 29, against the action of spring 33, thus drawing over the lever 75 and crosshead 77. This closes clutch 19, 23 and releases the brake 17.

Thus the energized motor 27 is free to drive the shaft 9 through closed clutch 19, 23, released shafting 11, and gearing 13. This causes a follow-up movement of the brushes 51 and 53 which continues until the contacts $c'$ and $i'$ are uncovered by the space between the brushes 51 and 53. When these contacts $c'$ and $i'$ are uncovered, the above outlined circuit is broken, thus de-energizing the motor 27 and the solenoid 31, whereupon the spring 33 draws open the clutch 19, 23 and sets the brake 17. Hence, the shaft 9, which operates that which is to be moved, is set into a new position, the amount of resetting being proportional to the angle to which the control brushes 41 and 43 were set.

During the time that the resetting was made, the switch 69 was closed and hence the pilot light or the equivalent 65 operated to show the operator that the system was functioning, and for how long.

It will be understood that the brushes 41, 43 have crossed certain sets of contacts prior to arriving at line A—A but it will be seen that the fact that the brushes 41, 43 pass over contacts in arriving at a given set, only effects operation in the desired manner; that is, the setting is started immediately when the first set of contacts is crossed.

An angularly reverse setting of switch 35 from any position energizes brush 53 to reverse the current in armature of motor 27 but not that in the field 55; hence, the following action is reverse to that traced above.

As shown in the drawings, the arc covered by brushes 41 and 43 respectively, is enough to effect a span of a set of contacts, while the arc covered by the spaces between brushes 51 and 53 is less than the space between successive contacts on switch 37.

Among the advantages of this system may be noted the ease with which the brushes 41, 43 may be turned to any desired position. The follow-up mechanism operates promptly with the force necessary for effecting the setting of shaft 9. The lag of the beginning of follow-up motion is short, and always the same, regardless of how great an adjustment is made at switch 35. This is because adjusting action sets in when the first contact is reached upon adjustment and is thereafter continuous until the adjusting action is completed.

Even without a type of gear 13 which prevents reverse driving from shaft 9 to 11, there is no force transmitted from the shaft 9 to the motor 27. This is because of the operation of brake 17 which maintains a setting after it is once made.

All or part of the wires 57, 47, 67, and those joining the contacts a—n and a'—n' may be in a single cable. This simplifies the layout of the apparatus inasmuch as such a cable may be positioned in corners and laid tortuously in a vehicle such as an airplane. It may be placed in corners and the like that are otherwise not used.

If one of the wire joining respective contacts a—n and a'—n' should accidentally break or cease to function it merely means that the corresponding setting may not be made but this does not prevent adjacent or other settings from being made, and thus, for instance, an airplane may be flown safely until a landing may be made and a repair effected. By having extra wires in the cable, these may be readily substituted by making proper connections and operation continued.

It will be understood that, although a manual control is referred to for resetting brushes 41 and 43, that automatic control of these may also be effected, such as by automatic gyroscopic apparatus or the like.

It will be further understood that as many repeater and control switches 37 may be operated in pairs as may be desirable, the single pair shown being merely exemplary. Control switches and operating mechanisms may be located at suitable points in a vehicle.

In Fig. 2 is shown another form of the invention in which like numerals designate like parts. In this form a positive positioning stop is used for switch 37 and both switches are relieved of heavy operating current (see the light and heavy lines in Fig. 2). Furthermore, certain manually operable emergency switches are included for direct control.

In this form of the invention, numeral 35 again represents the control switch with contacts a to n thereon but with a single brush 41 energized from the battery 45 by way of wires 47 and a switch 2.

The control switch 37 again has corresponding contacts a'—n' with brushes 51 and 53. The shaft 9 is again the controlled shaft and operated through gearing 13 from shaft 11, the latter again being splined to the element 19 of the clutch 19, 23. The driving element 23 of the clutch is driven from the armature of motor 27.

Braking is effected by means of a flange 4 on said driven clutch element 19 which, when the clutch is opened, contacts with a stationary member 6 to cause frictional drag. However, complete braking is not effected by the brake 4, 6 but by means of the aid of a positive stop used in connection with a drum 8 on shaft 11. This drum is no longer a brake drum but is in the nature of, or consists of, a wheel having a tapered notch 10 with which is engageable a tapered pawl 12.

The reduction in the gearing 13 is such that a whole number of revolutions of the wheel 8 results in movement of brushes 51 and 53, the pitch distance between a set of contacts. The pawl 12 forms one part of a bell-crank 14 which is controlled from the stem 73 of said solenoid 31, the spring return 33 being used to maintain the pawl 12 in the notch 10 when the latter is adjacent the former. The lever 75 is also articulated with said stem 73 so that when the pawl 12 is withdrawn from the notch 10, the clutch 19, 23 is closed and the drag brake 4, 6 releases.

The motor 27, in this modification, has a split field winding having elements 79 and 81 reversely wound for reversing motor movement.

Tracing the wires that have not already been described in connection with the embodiment of Figure 1 (and correspondingly lettered on Fig. 2), they will be seen to comprise wires 83 and 85 connecting the series field sections 79 and 81 respectively to a battery wire 87 by way of relay switches 89 and 91 respectively. The mid tap 93 of the field 79, 81 connects to the other side of the battery 45 by way of the armature of the motor 27, solenoid 31 and wire 59. One side of the battery 45, by means of wire 95 is connected to the relay coils 97 and 99 (see wires 101 and 103 respectively). Wire 105 connects the other side of coil 97 to brush 53 of switch 37 and wire 107 connects the other side of coil 99 to brush 51 of said switch 37.

Assuming that the handle of switch 2 is raised so as to close the upward contact on wire 47, the automatic operation of the device is as follows:

To effect a control, the brush 41 is moved to the position B—B (see handle H). This causes current to flow from the battery 45 over line 47 (through switch 2), brush 41, contact h, corresponding contact h' on switch 37, brush 53, wire 105, coil 97 of relay switch 89, wire 101, wire 95 and back to the battery 45.

The above causes closing of the relay switch 89 whereby heavier current is drawn from the battery 45 over wire 87, switch 89, wire 83, series coil 79, wire 93, armature of motor 27, solenoid coil 31, wire 59, and back to the battery 45. The coil 31 pulls over the link 73 against the return action of spring 33, thereby taking the pawl 12 out of the notch 10 and throwing lever 75 to the right, thereby opening drag brake 4, 6 and closing clutch 19, 23. The motor 27 drives through shaft 25, closed clutch 19, 23, shaft 11, gearing 13, and to shaft 9. Shaft 9 continues to turn until the gaps between brushes 51 and 53 break the circuit at contact h'.

As the circuit is broken, the notch 10 is approaching the location of the pawl 12 but preferably has not reached it. The breaking of the circuit, of course, de-energizes solenoid 31 and the spring 33 draws back stem 73 to rotate the lever 14 clockwise and force pawl 12 against the edge of disc 8. Adjustments are so made, in view of the inertia of the system that the drag of pawl 12 on disc 8 permits the notch 10 to advance, but with deceleration to the position of pawl 12. As the system decelerates the notch and pawl align and the pawl 12 drops into the notch 10. The action of the pawl 12 effects a positive stop, the brake 4, 6 reducing shock in the system. The taper on the pawl and notch results in the brake 4, 6 being immediately effective to reduce jar between the contact surfaces of the pawl and notch when they meet. It will be noted at this point that the relatively heavy armature of motor 27 is disconnected and therefore needs not be braked by brake 4, 6 or pawl 12. By this means there is obtained a positive stop for positioning the brushes 51 and 53 so that the contact at which it is desired to effect a break is midway in the respective gap between brushes. The system is also locked in adjusted position.

From the above it will be seen that a clockwise adjustment of the brush 41 on the control switch 35 effects energization of the series motor field coil 79, thus causing rotation of the motor in one direction. For rotating the motor in opposite direction to effect an opposite adjustment, the brush 41 is adjusted counterclockwise to a new position, such as position C—C. The low-current circuit then is as follows: Battery 45, wire 47, switch (including switch 2), brush 41, contact e, contact e', brush 51, wire 107, coil 99, wire 103, wire 95, and back to the battery 45.

Energization of coil 99 causes closing of the relay switch 81, and heavier current flows from the battery 45 through wire 37, switch 81, wire 85, reverse series coil 81, wire 83, armature of motor 27, solenoid coil 31, wire 58, and back to the battery 45. The pawl 12 is disengaged from the notch 10, the brake 4, 6 is open and the clutch 19, 23 is closed, while the motor 27 rotates in the direction adapted to move the shaft 8 for counterclockwise action of the follow-up, controlled switch 37.

The follow-up action continues until contact is broken at contact e' and the circuit opens. Under these conditions, the drag brake 4, 6 is again applied while the clutch 19, 23 is opened and the pawl 12 dropped. Deceleration is preferably about over when the notch 10 approaches the pawl 12 from the opposite side.

In this system it will be seen that one or the other of brushes 51 or 53 is energized by a setting and is used in connection with one of the series windings 79 or 81 respectively.

In this embodiment of the invention, safety features explained in connection with the first form of the invention still inhere; that is, a breakage of one of the connections between a contact on switch 35 and one on switch 37 will not completely disable the system. However, a further safeguard is provided in the switch 2 which may be thrown down so as to cut the control switch 35 out of circuit and throw into circuit the off-on manual control switch 16. This causes the wire 18 to be fed from the wire 47 and by throwing the arm of switch 16 to the right, wire 20 may be energized so as to energize the coil 97, and by throwing said arm to the left, wire 22 may be energized so as to energize the relay coil 99. Energization of these respective coils causes forward or backward movement of the motor 27 as above described so as to cause an adjustment of the controlled shaft 9. The degree of adjustment is proportional to the time that the arm of switch 16 is permitted to remain to the left or right.

The signal light 65 is still effective in this form of the invention, operating by action of arm 75 in connection with switch 69 connected across battery 45, as explained in connection with Fig. 1.

The difference between control by switch 16 and the control by switch 35 is that with switch 35 a predetermined setting may be made and dismissed from mind and the follow-up adjustments will be made automatically; whereas with switch 16, it must be held closed until the pilot feels, by the proper response from the ship, that the proper setting has been effected, as with the old type of mechanical control, except that his movements are not resisted. When the adjustment has been approximated, he re-opens the switch 16 and the dropping of the pawl 12 into the notch 10 assures a locking of the system near the desired setting. The purpose of the switch 16 is for use in emergencies if the switches 35 and/or 37 become disabled completely. It will be understood that switch 16 may be also gyroscopically, or otherwise automatically controlled, so that by alternatively setting switch 2, a manual control may be effected at handle H or gyroscopic control from switch 16.

In Figs. 3 and 4 is shown another form of the invention wherein single brushes are used on both of the switches 35 and 37, and wherein a step-by-step operating mechanism is used. Similar reference characters indicate similar parts and connections in this modification. Where they differ, new reference characters have been used. This system also shows a compound pilot light system whereby an indication is had as to whether an adjustment is taking place one way, or the reverse.

In this form of the invention, the brush 43 is electrically connected with a central metallic conducting ring 109 which has a frictional, metallic contact with a second conducting ring 111, the latter having a conducting arm 113, which is the central swinging contact of a switch 115. The switch 115 has stationary contacts 117 and 119. Thus, it will be seen that by turning the handle H counterclockwise, an incipient drag is effected between the rings 109 and 111, whereby the brush 43 is rotated counterclockwise. After the central contact of the switch 115 strikes the right-hand contact 119, the ring 111 stops its advance, while the ring 109 proceeds with the brush 43. Thus the brush 43 is energized as soon as an adjustment is started by means of the handle H. Clockwise movement results in closing of contact 117 as the brush 43 moves clockwise. The battery 45 feeds the single brush 120 on switch 37, said brush 43 covering all except one of the contacts a'—n'. Thus under certain conditions, all contacts on switch 37 are energized except the one which corresponds to the contact on switch 35 upon which normally rests the brush 43. Upon making an adjustment of handle H, the brush 43 is set to another contact on switch 35 and this contact is of course, energized. Thus current flows from switch 37 to switch 35, through the brush 43, rings 109, 111, through contact 117 (assuming that the handle H has been adjusted clockwise), wire 121, solenoid coil 123, switch 125, wire 127, wire 129, wire 131, and back to the battery 45. At the same time, current flows through the pilot lamp R (which indicates clockwise adjustment), by way of wires 133, 135, 131, and back to battery 45.

It will be seen that energization of the coil 123 will draw over hinged armature 137 which is normally spring-returned by a spring 139. The armature 137 has pivoted thereto a pawl 141 normally pressed by a spring 143 against an upward stop 145. The pawl 141, upon being drawn to the left, contacts one of the teeth 147 of the ratchet wheel 149 attached to the controlled shaft 9. A detent 151 ensures the advance of a single tooth pitch or multiple thereof for each stroke of the pawl 141.

As soon as the armature is drawn towards the coil 123, the switch 125 in connection therewith is opened to break the said circuit, thus de-energizing the solenoid 123 and permitting the spring 139 to draw back the armature 137 with its pawl 141. This immediately recloses the switch 125 and the action is repeated. The repeating action goes on until the shaft 9 is turned so that the brush 120 causes the opening 153 therein to come opposite one of the contacts a'—n' which corresponds to one of the contacts a—n on switch 35 contacted by the brush 43. Thus, the particular circuit closed by movement of the brush 43 is re-opened and the controlled member thus re-set.

Assuming that the handle H is moved in a counterclockwise direction, the contact 119 is closed. Thus current flows from the battery 45, through brush 120, one of the contacts (say $e'$, to contact $e$, upon which the brush 43 is assumed to be resting by adjustment), ring 109, ring 111, contact 119, wire 155, solenoid 157, switch 159, wire 161, wires 129, 131 and back to battery 45. This causes a repeating action on an armature 163 returned by spring 165 and pivotally supporting a pawl 167 normally pressed by spring 169 against the stop 171 and engageable with said teeth 147 of the ratchet wheel 149. The pawl 167 causes an opposite rotation of the ratchet wheel 149 so that the brush 120 advances to a position so that said contact $e'$ is positioned in the space 153, thus opening the previously closed circuit. While the counterclockwise adjustment goes on, the left-hand pilot lamp indicating counterclockwise adjustment is energized over wires 173, 175, 135, 131, to battery 45.

In Figure 4 is shown a detail of the connections between the corresponding switches 35 and 37, applicable in detail to the form of the invention shown in Figure 3. It will be understood that in general a similar set of connections is used between corresponding contacts on said switches 35 and 37. The connecting wires are indicated at numerals 177 in Figure 4. These are the insulated wires that are placed in a single cable for convenience in distribution of energy.

It will be understood, that although a battery is shown as a source of energy in the systems disclosed, that other sources of energy may be used.

Furthermore, the motorizing means of the mechanism may be varied in structure and design.

It will be seen that in all forms of the invention the electrical circuit is normally open, and shuts only during periods of adjustment.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In remote control apparatus, a control switch having a plurality of contacts, a circuit, means for selectively energizing said contacts from said circuit, controlled means and a controlled switch articulated therewith, said controlled switch having a plurality of contacts corresponding to those of the control switch and respectively electrically connected, a plurality of separate brushes on the controlled switch each engaging one less than half of the number of contacts and connected in said circuit, relay switches respectively energizable from one controlled switch brush, a motor, means for energizing said motor to move forwardly or in reverse according to the selective action of said relays, a solenoid in said circuit, a drive connection between the motor and said controlled switch, a clutch in said connection and a positive stop, said clutch being adapted to be closed upon energization of the circuit and said positive stop released, and vice versa upon deenergization of the circuit, said control switch closing the circuit to one or the other of said control switch brushes depending upon the direction of movement of the control switch, whereby the motor is moved in one direction or another to cause the controlled switch motion to follow-up that of the control switch, whereby the controlled switch ultimately re-opens the circuit, and speed reducing means between the positive stop means and the controlled switch, the ratio of movement between the positive stop means and the controlled switch being such as to positively effect maximum controlled switch opening under locked conditions of the locking means.

2. In remote control apparatus, a circuit, means for energizing said circuit, a plurality of parallel connections in said circuit, a control switch having a plurality of contacts in said parallel connections, a controlled switch having a corresponding plurality of contacts in said plurality of connections, brushes in the control and controlled switches connected in said circuits in normal positions respectively closing and opening certain contacts, means for driving the controlled switch to follow-up motion of the controlled switch when the latter is set in closed position at a given contact whereby a corresponding contact in the controlled switch is opened, an operating mechanism between the drive means and the controlled switch, means for positively locking the operating mechanism in a predetermined position after the control and controlled switches are moved to corresponding positions, said locking means being unlocked when the circuit is energized and locked when the circuit is de-energized, and means for decelerating the operating mechanism as the locking means comes into operation.

3. In remote control apparatus, a circuit, means for energizing said circuit, a plurality of parallel connections in said circuit, a control switch having a plurality of contacts in said parallel connection, a controlled switch having a corresponding plurality of contacts in said plurality of connections, brushes in the control and controlled switches connected in said circuits in normal positions respectively closing and opening corresponding contacts, means for driving the controlled switch to follow the motion of the control switch when the latter is set to closed position at a given contact whereby a corresponding contact in the controlled switch is opened, means for positively locking the operating mechanism in a predetermined position after the control and controlled switches are moved to corresponding positions, said locking means being unlocked when the circuit is energized and locked when the circuit is de-energized, and clutch means between the motor and the controlled switch adapted to be closed upon energization of the circuit and opened upon de-energization.

4. In remote control apparatus, a circuit, means for energizing said circuit, a plurality of parallel connections in said circuit, a control switch having a plurality of contacts in said parallel connection, a controlled switch having a corresponding plurality of contacts in said plurality of connections, brushes in the control and controlled switches connected in said circuits in normal positions respectively closing and opening corresponding contacts, means for driving the controlled switch to follow-up motion of the control switch when the latter is set to closed position at a given contact whereby a corresponding contact in the controlled switch is opened, means for positively locking the operating mechanism in a predetermined position after the control and controlled switches are moved in the corresponding positions, said locking means being unlocked when the circuit is energized and locked when the circuit is deenergized, clutch means between the motor and the controlled switch adapted to be closed upon energization of the circuit and opened upon de-energization, and a brake between said motor and said controlled switch openable when said clutch is closed and vice versa.

5. In remote control apparatus, a circuit, means for energizing said circuit, a plurality of parallel connections in said circuit, a control switch having a plurality of contacts in said parallel connection, a controlled switch having a corresponding plurality of contacts in said plurality of connections, brushes in the control and controlled switches connected in said circuits in normal positions respectively closing and opening corresponding contacts, means for driving the controlled switch to follow the control switch when the latter is set to closed position at a given contact, whereby a corresponding contact to controlled switch is opened, an auxiliary circuit for energizing the driving means independently of the said control switch, and a switch whereby operation by said control switch or said last-named switch may be selected.

6. In remote control apparatus, a control switch having a plurality of contacts, a circuit, means for selectively energizing said contacts from said circuit, a controlled means and a controlled switch articulated therewith, said controlled switch having a plurality of contacts corresponding to those in the control switch and respectively electrically connected, a plurality of separate brushes in the controlled switch each engaging one less than half of the number of contacts and connected in said circuit, relay switches respectively energizable from the respective controlled switch brushes, a motor, means for energizing said motor to move forwardly or in reverse according to the selective action of said relays, a solenoid in said circuit, a drive connection between the motor and said controlled switch, a clutch in said connection and a positive stop, said clutch being adapted to be closed and said positive stop released upon energization of the circuit and vice versa upon de-energization of the circuit, said control switch closing the circuit to one or the other of said controlled switch brushes depending upon the direction of adjustment of the control switch whereby the motor is moved in one direction or another to cause the controlled switch motion to follow up that of the control switch, whereby the controlled switch ultimately re-opens the circuit, and pilot means adapted to be energized upon setting the control switch to indicate the period of the following action by the controlled switch.

7. In remote control apparatus, a circuit, means for energizing said circuit, a plurality of parallel connections in said circuit, a control switch having a plurality of contacts in said parallel connections, a controlled switch having a corresponding plurality of contacts in said plurality of connections, a device to be operated being connected with the controlled switch, brushes in the control and controlled switches connected in said circuits in normal positions respectively closing and opening certain contacts, drive means for driving the controlled switch to follow-up motion of the controlled switch when the latter is set in closed position at a given contact whereby a corresponding contact in the controlled switch is opened, an operating mechanism between the drive means and the controlled switch, means for positively locking the operating mechanism in a predetermined position after the control and controlled switches are moved to corresponding positions, said locking means being unlocked when the circuit is energized and locked when the circuit is de-energized, means for decelerating the operating mechanism as the locking means comes into operation, and means for disconnecting the drive means from the operating mechanism as the decelerating means comes into action.

8. In remote control apparatus, a controlled element, a source of energy and a circuit energized thereby, an operating mechanism for moving the controlled element, means for effecting the energization of the operating mechanism comprising a plurality of switches in said circuit, a plurality of contacts in each switch, an electric circuit between switches, means in one switch whereby said circuit may be predeterminately closed to energize the operating mechanism, and means in the other switch associated with the operating mechanism whereby after a predetermined period of operation, said circuit is again opened, a positive brake for the controlled element operable only at predetermined positions of said controlled element, and a friction brake for decelerating the controlled element in conjunction with the operation of the positive brake, said positive and friction brakes being responsive to open when said operating mechanism is actuated.

9. Remote control apparatus comprising means to be controlled, driving means for adjusting said controlled means, a circuit for the driving means, a controlled switch driven from the driving means, means whereby a setting of the controlled switch energizes the driving means to move the controlled means and controlled switch to again set the circuit for de-energization of the driving means, a clutch between said driving means and the controlled means, a friction brake between the clutch and the controlled means and a positive brake for the controlled means, said clutch being adapted to be automatically opened when the driving means is de-energized, said friction and positive brakes being then biased toward braking position, said positive brake exactly determining the positions of rest of the controlled switch and controlled means, said friction brake eliminating the shock of positive braking.

10. Remote control apparatus comprising means to be controlled, driving means for adjusting said controlled means, a circuit for the driving means, a controlled switch driven from the driving means, means whereby a setting of the controlled switch energizes the driving means to move the controlled means and controlled switch to again set the circuit for de-energization of the driving means, a clutch between said driving means and the controlled means, a friction brake between the clutch and the controlled means and a positive brake for the controlled means, said clutch being adapted to be automatically opened when the driving means is deenergized, said friction and positive brakes being then biased toward braking position, said positive brake exactly determining the positions of rest of the controlled switch and controlled means, said friction brake eliminating the shock of positive braking, and a gear connection between the positive braking means and the controlled switch whereby the latter is only in predetermined positions when the positive braking means becomes effectively operative.

11. In remote control apparatus, a circuit, means for energizing said circuit, a plurality of parallel connections in said circuit, a control switch having a plurality of contacts in said parallel connection, a controlled switch having a corresponding plurality of contacts in said plurality of connections, brushes in the control and controlled switches connected in said circuits in normal positions respectively closing and opening certain contacts, means for driving the controlled switch to follow-up motion of the control switch when the latter is set in closed position at a given contact whereby a corresponding contact in the controlled switch is opened, and means for positively locking the operating mechanism in a predetermined position after the control and controlled switches are moved to corresponding positions, said locking means being unlocked when the circuit is energized and locked when the circuit is de-energized, and a friction brake adapted to eliminate any substantial shock of the positively locking means, said friction brake being open when the circuit is energized and closed when the circuit is de-energized.

12. In remote control apparatus, a circuit, means for energizing said circuit, a plurality of parallel connections in said circuit, a control switch having a plurality of contacts in said parallel connections, a controlled switch having a corresponding plurality of contacts in said plurality of connections, a device to be operated connected with the controlled switch, brushes in the control and controlled switches connected in said circuits in normal positions respectively closing and opening certain contacts, means for driving the controlled switch to follow-up motion of the control switch when the latter is set in closed position at the given contact whereby a corresponding contact in the controlled switch is opened, an operating mechanism between the drive means and the controlled means, means for positively locking the operating mechanism is a predetermined position after the control and controlled switches are moved to corresponding positions, said locking means being unlocked when the circuit is energized and locked when the circuit is de-energized, a friction brake adapted to eliminate any substantial shock of the positively locking means, said friction brake being open when the circuit is energized, and closed when the circuit is de-energized, a speed reducing element in the operating mechanism between the driving means and the controlled switch causing predetermined angular setting of the controlled switch for each operation of the positive locking means, and means for disconnecting the driving means from the controlled switch whenever the braking means is operated.

13. In apparatus of the class described, a controlled member, a motor, means connecting said motor to drive said controlled member, a positive stop means for the controlled member which is operable only at predetermined positions of the controlled member, a friction brake means operable to brake the controlled means and avoid shock due to operation of said positive stop means, a clutch between said motor and said controlled means, and means for operating said clutch to open substantially simultaneously with the closing of the friction brake means.

14. In apparatus of the class described, a controlled member requiring substantial force to position the same, a motor, means connecting said motor to drive said controlled member including a positive stop means operable at predetermined positions of the controlled member, a friction brake means operable to brake the controlled means and avoid shock due to operation of said positive stop means, and speed reducing means in said means connecting said motor to the controlled member and located between the stop means and the controlled member.

ARTHUR B. NEWELL.